United States Patent
Miyazaki

(10) Patent No.: US 6,537,938 B1
(45) Date of Patent: Mar. 25, 2003

(54) GLASS FOR ANODIC BONDING

(75) Inventor: Seiji Miyazaki, Chiba (JP)

(73) Assignee: Asahi Techno Glass Corporation, Funabashi (JP)

( * ) Notice: Subject to any disclaimer, the term of this patent is extended or adjusted under 35 U.S.C. 154(b) by 91 days.

(21) Appl. No.: 09/653,862

(22) Filed: Sep. 1, 2000

(30) Foreign Application Priority Data

Sep. 2, 1999 (JP) ............................. 11-249271

(51) Int. Cl.$^7$ ........................... C03C 3/091; C03C 3/085
(52) U.S. Cl. ................................. 501/66; 501/69
(58) Field of Search ..................... 501/66, 69

(56) References Cited

U.S. PATENT DOCUMENTS 3,642,504 A * 2/1972 Petzold et al. ............... 106/39
3,811,901 A * 5/1974 Bacon ........................ 106/50
4,229,220 A * 10/1980 Hirota ..................... 106/47 R
5,736,061 A 4/1998 Fukada et al.
5,998,037 A * 12/1999 Sridharan et al. ........... 428/472

FOREIGN PATENT DOCUMENTS

| JP | 2577493 | 11/1996 |
| WO | WO 97/07701 | 7/1990 |

OTHER PUBLICATIONS

L.J. Spangler, et al., pp. 140–143, "A New Silicon–On–Glass Process for Integrated Sensors," 1988.

* cited by examiner

Primary Examiner—Christopher A. Fiorilla
(74) Attorney, Agent, or Firm—Oblon, Spivak, McClelland, Maier & Neustadt, P.C.

(57) ABSTRACT

A glass for anodic bonding, which is a glass to be anodically bonded to a silicon crystal substrate and which contains substantially no $Na_2O$ and contains from 4 to 8 mol % of $Li_2O$.

5 Claims, 1 Drawing Sheet

GLASS FOR ANODIC BONDING

BACKGROUND OF THE INVENTION

1. Field of the Invention

The present invention relates to a glass which is useful for e.g. a member of a semiconductor sensor and which can be effectively bonded by anodic bonding to a silicon crystal substrate (hereinafter referred to simply as "the silicon").

2. Discussion of Background

Heretofore, semiconductor sensors for measuring the pressure of a gas or liquid, or the acceleration of a body in motion, have been widely practically used in the field of automobiles or measuring instruments. These sensors are designed mainly to detect a change in the electrical capacitance or strain exerted to the silicon, and miniaturization, cost reduction and improvement in sensitivity have been advanced by micromachining technology.

On the other hand, as a member for a semiconductor sensor, a glass having a thermal expansion coefficient close to the silicon is employed as a support or substrate for supporting the silicon. This glass also has a feature that it can be bonded to the silicon by an anodic bonding method which employs no adhesive, whereby the residual strain at the bond interface can be suppressed to a minimum level, and thus it has contributed to an improvement of the sensor properties.

Anodic bonding is a method wherein a glass is heated to a temperature at which readily mobile cations contained in the glass are readily mobile, and using the silicon as an anode and the glass as a cathode, a DC voltage is applied to heat-bond them. It is considered that cations in the glass move to the cathode, and as a result, non-bridging oxygen ions in the glass at the interface with the silicon will establish covalent bond with the silicon, whereby firm bonding will be established between them.

Heretofore, as a glass suitable for such an application, an aluminosilicate glass having a low thermal expansion coefficient has been invented and disclosed in JP-A-4-83733. The curve of the thermal expansivity of such a glass resembles the curve of the thermal expansivity of the silicon, and it has a feature that it contains sodium as readily mobile cations essential for anodic bonding with the silicon.

However, sodium is a component which sharply increases the thermal expansion coefficient of the glass, whereby its content in the glass is limited. Consequently, the amount of sodium ions mobile during the anodic bonding is also limited. In order to carry out the anodic bonding efficiently, it is essential to let sodium ions move as many as possible. For that purpose, a high temperature and a high voltage are required. Specifically, the anodic bonding is presently carried out at about 400° C. at about 800V.

On the other hand, along with the progress in the micromachining technology in recent years, the sensors have been modified for high integration and more complicated structures, and lamination of silicon or glass, or an element having a sandwich structure, has also been developed, whereby anodic bonding is carried out several times for a single member. Further, there has been an increasing trend for adopting a step of anodic bonding after forming a circuit or a pattern on a substrate.

Under these circumstances, it has been desired to lower the temperature during the anodic bonding to prevent thermal damage of a sensor element during the bonding, in addition to the demand for efficiency in the anodic bonding. JP-A-5-9039 discloses a glass-ceramic having crystals of β-quartz solid solution precipitated and having sodium introduced in a large amount, which has a minus thermal expansion coefficient. This publication discloses Examples wherein anodic bonding was carried out at 150° C. However, there has been a problem that as the glass used, is a glass-ceramic, not only the process steps increase for e.g. precipitation of crystals, but also the curve of the thermal expansivity of the glass does not necessarily resemble the curve of the thermal expansivity of the silicon, as compared with the aluminosilicate glass.

SUMMARY OF THE INVENTION

The present invention is intended to solve the above-mentioned conventional problems and to provide a glass whereby anodic bonding is possible at a temperature lower than 300° C. without losing the matching to the curve of the thermal expansivity of the silicon.

The present inventors have conducted an extensive study to solve the above problems, and as a result, have found that lithium has a substantial effect to reduce the volume resistivity of glass, which is an index indicating the efficiency for anodic bonding. Besides, it has been found that lithium has a little effect to increase the thermal expansion coefficient of glass, and accordingly, a large amount of lithium can be introduced to effectively reduce the volume resistivity. Further, it has been found that even without containing sodium, firm anodic bonding can be carried out in the same manner as with the conventional sodium-containing glass.

The present invention has been accomplished on the basis of the above discoveries, and firstly, the present invention provides a glass for anodic bonding, which is a glass to be anodically bonded to a silicon crystal plate and which contains substantially no $Na_2O$ and contains from 4 to 8 mol % of $Li_2O$.

Secondly, the present invention provides such a glass which is an aluminosilicate glass and which has an average thermal expansion coefficient within a range of from room temperature to 300° C. within a range of from $25\times10^{-7}$/° C. to $40\times10^{-7}$/° C. and is capable of being anodically bonded to a silicon crystal plate at a temperature lower than 300° C.

Thirdly, the present invention provides the above-mentioned first or second glass which has a composition consisting essentially of from 56 to 70 mol % of $SiO_2$, from 7 to 17 mol % of $Al_2O_3$, from 4 to 8 mol % of $Li_2O$, from 1 to 11 mol % of MgO, from 4 to 12 mol % of ZnO, from 14 to 23 mol % of $Li_2O+MgO+ZnO$, from 0 to 9 mol % of $B_2O_3$ and from 0 to 3 mol % of CaO+BaO.

Fourthly, the present invention provides the above-mentioned third glass which preferably has a composition consisting essentially of from 60 to 68 mol % of $SiO_2$, from 7 to 12 mol % of $Al_2O_3$, from 5 to 7 mol % of $Li_2O$, from 3 to 9 mol % of MgO, from 5 to 10 mol % of ZnO, from 15 to 21 mol % of $Li_2O+MgO+ZnO$, from 5 to 9 mol % of $B_2O_3$ and from 0 to 2 mol % of CaO+BaO.

DETAILED DESCRIPTION OF THE PREFERRED EMBODIMENTS

Figure 1:
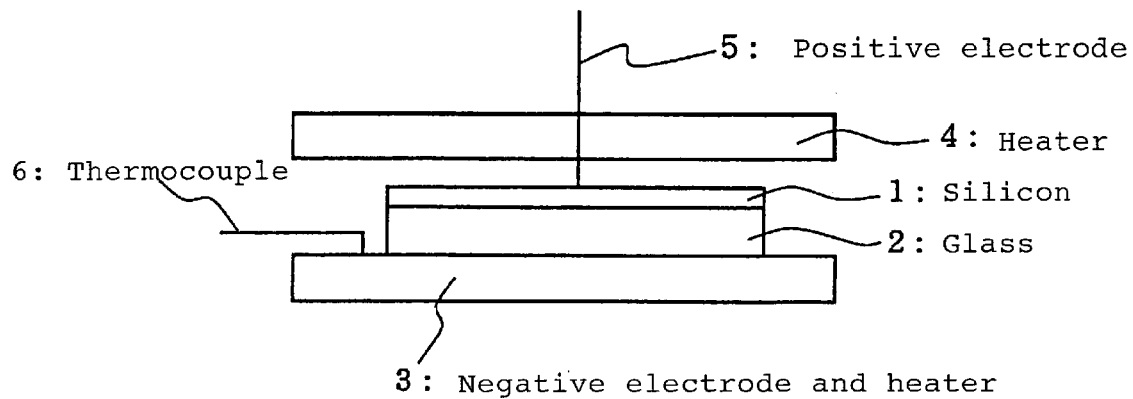
FIG. 1 is a view illustrating an apparatus for anodic bonding.

In the glass for anodic bonding of the present invention, $Li_2O$ serves as readily mobile cations during anodic bonding of the glass. Further, it is an essential component to reduce the volume resistivity of the glass and to make it possible to anodically bond the glass to the silicon at a temperature lower than 300° C. Further, it is also a component to lower the viscosity of the glass and to remarkably improve the melting property. If it is less than 4 mol %, heating at a temperature of at least 300° C. will be required for the anodic bonding of the glass to the silicon, such being undesirable. If it exceeds 8 mol %, the thermal expansion coefficient of the glass tends to be large, and the glass tends to undergo devitrification. More preferably, it is within a range of from 5 to 7 mol %.

In the glass for anodic bonding of the present invention, $Na_2O$ is likely not only to increase the thermal expansion coefficient of the glass but also to increase the volume resistivity by the mixed alkali effect with $Li_2O$. Accordingly, it should not be contained substantially. Namely, its inclusion as an impurity from raw material, etc., is admissible within a range not to impair the purpose of the present invention, but it is preferably less than 0.5 mol %, more preferably not more than 0.2 mol %, particularly preferably not more than 0.1 mol %.

To be close to the curve of the thermal expansivity of the silicon, the average thermal expansion coefficient of the glass for anodic bonding of the present invention within a range of from room temperature to 300° C. is preferably within a range of $25 \times 10^{-7}/°$ C. to $40 \times 10^{-7}/°$ C.

Now, a preferred composition of the glass for anodic bonding of the present invention will be described. The proportions of the components in the following will be represented by mol %.

$SiO_2$ is a network former for the glass and is a component which is effective for introducing $Li_2O$ in a large amount thereby to contribute to reducing the expansion of the glass. If it is less than 56%, the thermal expansion coefficient of the glass tends to be large, and the chemical durability of the glass tends to deteriorate. On the other hand, if it exceeds 70%, the melting property of the glass tends to remarkably deteriorate. More preferably, it is within a range of from 60 to 68%.

$Al_2O_3$ is a component which is effective to bring the curve of the thermal expansivity of the glass close to the curve of the thermal expansivity of the silicon. Further, it improves the stability and the chemical durability of the glass. If it is less than 7%, the thermal expansion coefficient of the glass tends to be large, and the tendency for phase separation increases, such being undesirable. If it exceeds 17%, the viscosity of the glass tends to increase, and the volume resistivity tends to increase. More preferably, it is within a range of from 7 to 12%.

MgO is a component which stabilizes the glass and improves the melting property. If it is less than 1%, no such effects tend to be obtainable. If it exceeds 11%, the thermal expansion coefficient of the glass tends to be large, and the glass tends to undergo devitrification. More preferably, it is within a range of from 3 to 9%.

ZnO is a component which improves the melting property and the chemical durability of the glass. If it is less than 4%, such effects tend to be small, and if it exceeds 12%, the thermal expansion coefficient of the glass tends to be large, and the glass tends to undergo devitrification. More preferably, it is within a range of from 5 to 10%.

With respect to three components of $Li_2O$, MgO and ZnO, if their total amount is less than 14%, the melting property of the glass tends to deteriorate, such being undesirable. If the total amount exceeds 23%, the thermal expansion coefficient of the glass tends to be too large, such being undesirable. More preferably, the total amount is within a range of from 15 to 21%.

As an optional component, $B_2O_3$ is a component which is effective for improving the melting property of the glass without increasing the thermal expansion coefficient of the glass. However, it is preferably at most 9%, since it is likely to deteriorate the chemical durability of the glass. Further, in order to improve the melting property of the glass, CaO and BaO may be incorporated, but if their total amount exceeds 3%, the thermal expansion coefficient of the glass tends to be large, and the volume resistivity of the glass also tends to be large, such being undesirable.

In addition to the above components, the glass may further contain other components within a range not to adversely affect the properties of the glass, i.e. within a range such that the total of their contents is from 0 to 5%. For example, for the improvement of the chemical durability of the glass, it may contain from 0 to 2% of $ZrO_2$ or from 0 to 3% of $La_2O_3$. As a refining agent of melting the glass, $Sb_2O_3$, $SO_3$, a chloride, a fluoride, etc., may be contained in a total amount within a range of from 0 to 1%.

The glass of the present invention is obtained in such a manner that various starting materials are mixed in proper amounts, then heated and melted at a temperature of from about 1,550 to 1,650° C., then introduced into e.g. a mold and formed into a block, followed by annealing and processing to a predetermined size.

The second glass thus obtained according to a preferred embodiment of the present invention, is an aluminosilicate glass and contains a large amount of lithium, whereby it is possible to carry out anodic bonding of the glass with the silicon at a temperature lower than 300° C. Further, in the third glass according to another preferred embodiment, the average thermal expansion coefficient from room temperature to 300° C. is within a range of from $25 \times 10^{-7}/°$ C. to $40 \times 10^{-7}/°$ C., which is close to the curve of the thermal expansivity of the silicon. Accordingly, by using the glass of the present invention, it is possible to minimize a thermal residual strain, deformation or curvature of a bonded body after the anodic bonding with the silicon.

Now, the present invention will be described in further detail with reference to Examples. However, it should be understood that the present invention is by no means restricted to such specific Examples.

EXAMPLES 1 to 8 and COMPARATIVE EXAMPLES 1 to 3

Commonly employed glass materials such as oxides, hydroxides, carbonates and nitrates were suitably selected, weighed and mixed to form 1 kg of glass and to have the composition (unit: mol %) as identified in Table 1. Then, the mixture was put into a platinum crucible, then melted for 10 hours in a resistance heating electric furnace of 1,600° C., defoamed, homogenized and introduced into a mold, followed by annealing at a predetermined temperature to obtain a glass block. From this glass block, a test piece for measuring the thermal expansion coefficient and a plate material having the polished surface for anodic bonding, were prepared.

Then, the thermal expansivity was measured by a differential thermal expansion meter, and the average thermal expansion coefficient from room temperature to 300° C. was calculated. On the other hand, anodic bonding was carried out in such a manner that in an apparatus provided with heaters 3 and 4 made of carbon and electrodes 3 and 5, as shown in FIG. 1, the silicon (a silicon wafer) 1 and a glass plate 2 were disposed, and after evacuation, heated to a predetermined temperature by electrically heating the heaters 3 and 4, and then a DC voltage of 800V was applied for 10 minutes by setting the silicon to be positive and the glass to be negative. The heating was carried out at three temperature levels of 240, 270 and 300° C. After cooling, the appearance of the bonded sample was inspected, whereby one with the bonded region being at least 90% was identified with symbol ○, one with the bonded region being at least 50% was identified with symbol Δ, and one with the bonded region being less than 50% was identified with symbol X. The results are shown in Table 1.

Figure 2:
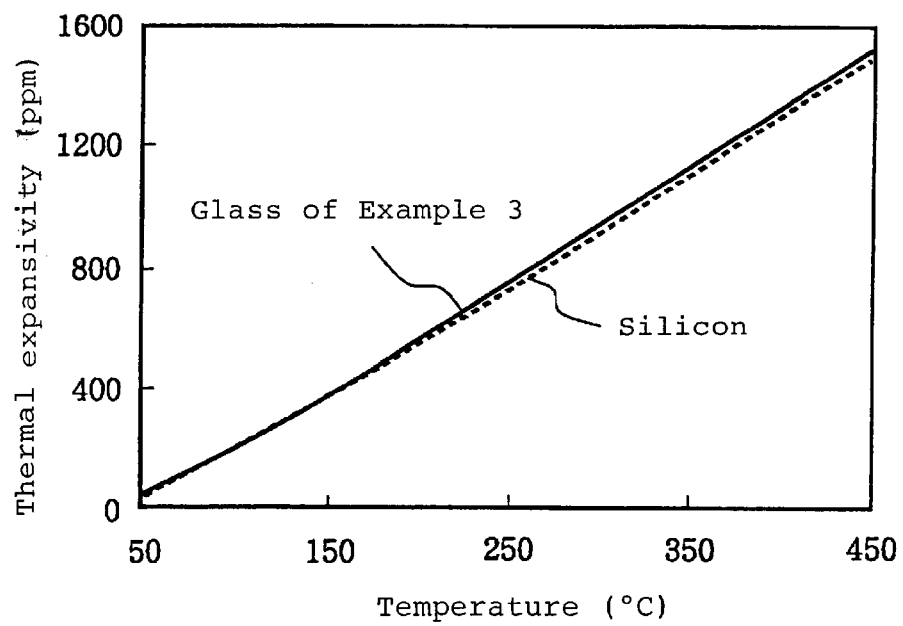
FIG. 2 shows the curves of thermal expansivities of the silicon and the glass of Example 3.

As shown in Table 1, in each Example, the thermal expansion coefficient showed a small value at a level of from $25 \times 10^{-7}/°$ C. to $40 \times 10^{-7}/°$ C. As an example, the curve of the thermal expansivity of the glass of Example 3 was very close to the curve of the thermal expansivity of the silicon, as shown in FIG. 2. Further, in each Example, bonding with the silicon was possible at a temperature lower than 300° C. Whereas, in Comparative Examples 1 to 3 wherein the lithium content is from 0 to 3% and the sodium content is from 1 to 4%, bonding was impossible at a temperature lower than 300° C., although the thermal expansion coefficient was low.

TABLE 1

| Glass composition | Examples | | | | | | | | Comparative Examples | | |
|---|---|---|---|---|---|---|---|---|---|---|---|
| | 1 | 2 | 3 | 4 | 5 | 6 | 7 | 8 | 1 | 2 | 3 |
| $SiO_2$ | 66 | 65 | 67 | 62 | 58 | 63 | 68 | 66 | 67 | 65 | 83 |
| $Al_2O_3$ | 9 | 11 | 8 | 16 | 16 | 13 | 8 | 15 | 10 | 13 | 1 |
| $B_2O_3$ | 6 | 7 | 8 | 4 | 6 | 7 | 6 | 3 | 6 | 4 | 12 |
| $Li_2O$ | 6 | 7 | 5 | 6 | 5 | 4 | 5 | 6 | 3 | 0 | 0 |
| MgO | 5 | 3 | 5 | 3 | 4 | 3 | 8 | 5 | 5 | 9 | 0 |
| ZnO | 8 | 7 | 7 | 8 | 9 | 9 | 4 | 5 | 7 | 6 | 0 |
| $Na_2O$ | 0 | 0 | 0 | 0 | 0 | 0 | 0 | 0 | 1 | 3 | 4 |
| CaO | 0 | 0 | 0 | 0 | 1 | 1 | 0 | 0 | 1 | 0 | 0 |
| BaO | 0 | 0 | 0 | 0 | 0 | 0 | 1 | 0 | 0 | 0 | 0 |
| $ZrO_2$ | 0 | 0 | 0 | 1 | 1 | 0 | 0 | 0 | 0 | 0 | 0 |
| ATEX* ($\times 10^{-7}/°$ C.) | 38 | 35 | 34 | 34 | 36 | 32 | 37 | 33 | 34 | 34 | 33 |
| Anode bonding property | | | | | | | | | | | |
| 240° C. | ○ | ○ | ○ | Δ | Δ | x | ○ | x | x | x | x |
| 270° C. | ○ | ○ | ○ | ○ | ○ | ○ | ○ | ○ | x | x | x |
| 300° C. | ○ | ○ | ○ | ○ | ○ | ○ | ○ | ○ | x | x | ○ |

ATEX* Average thermal expansion coefficient

The glass of the present invention contains lithium, whereby it can be anodically bonded to the silicon at a temperature lower than 300° C., and the thermal expansion coefficient shows a small value at a level of from $25 \times 10^{-7}/°$ C. to $40 \times 10^{-7}/°$ C. With the glass of the present invention, not only the curve of the thermal expansivity is close to the curve of the thermal expansivity of the silicon, but also it can be anodically bonded to the silicon at a low temperature, whereby the thermal strain of a silicon/glass bonded body after cooling is very small, and it is possible to obtain a silicon/glass bonded body having excellent sensor properties. Further, it is effective for improving the yield for anodic bonding or for shortening the tact. Further, it is effective not only for protecting the sensor circuit but also for widening the applicable range of a member which is relatively thermally weak. Accordingly, the glass of the present invention is useful as a glass which is anodically bonded to the silicon.

What is claimed is:

1. A glass for anodic bonding, which is a glass to be anodically bonded to a silicon crystal substrate and which contains substantially no $Na_2O$ and contains from 4 to 8 mol % of $Li_2O$ and from 3 to 9 mol % of $B_2O_3$, which is an aluminosilicate glass and which has an average thermal expansion coefficient within a range of from room temperature to 300° C. within a range of from $25 \times 10^{-7}/°$ C. to $40 \times 10^{-7}/°$ C. and is capable of being anodically bonded to a silicon crystal substrate at a temperature lower than 300° C.

2. The glass for anodic bonding according to claim 1, which has a composition consisting essentially of from 56 to 70 mol % of $SiO_2$, from 7 to 17 mol % of $Al_2O_3$, from 4 to 8 mol % of $Li_2O$, from 1 to 11 mol % of MgO, from 4 to 12 mol % of ZnO, from 14 to 23 mol % of $Li_2O+MgO+ZnO$, from 3 to 9 mol % of $B_2O_3$ and from 0 to 3 mol % of CaO+BaO.

3. The glass for anodic bonding according to claim 2, which has a composition consisting essentially of from 60 to 68 mol % of $SiO_2$, from 7 to 12 mol % of $Al_2O_3$, from 5 to 7 mol % of $Li_2O$, from 3 to 9 mol % of MgO, from 5 to 10 mol % of ZnO, from 15 to 21 mol % of $Li_2O+MgO+ZnO$, from 5 to 9 mol % of $B_2O_3$ and from 0 to 2 mol % of CaO+BaO.

4. A glass for anodic bonding, which is a glass to be anodically bonded to a silicon crystal substrate and which contains substantially no $Na_2O$, and which has a composition consisting essentially of from 56 to 70 mol % of $SiO_2$, from 7 to 17 mol % of $Al_2O_3$, from 4 to 8 mol % of $Li_2O$, from 1 to 11 mol % of MgO, from 4 to 12 mol % of ZNO, from 14 to 23 mol % of $Li_2O+MgO+ZnO$, from 3 to 9 mol % of $B_2O_3$ and from 0 to 3 mol % of CaO+BaO.

5. The glass for anodic bonding according to claim 4, which has a composition consisting essentially of from 60 to 68 mol % of $SiO_2$, from 7 to 12 mol % of $Al_2O_3$, from 5 to 7 mol % of $Li_2O$, from 3 to 9 mol % of MgO, from 5 to 10 mol % of ZnO, from 15 to 21 mol % of $Li_2O+MgO+ZnO$, from 5 to 9 mol % of $B_2O_3$ and from 0 to 2 mol % of CaO+BaO.

* * * * *